United States Patent
Bic

[11] Patent Number: 6,000,907
[45] Date of Patent: Dec. 14, 1999

[54] FLUID-ACTIVATABLE VANE FOR A FLUID TURBINE

[76] Inventor: Adrian Bic, 43 Westwood Drive, Apt. 110, Kitchener, Ontario, Canada, N2M 2K5

[21] Appl. No.: 09/139,076

[22] Filed: Aug. 24, 1998

[51] Int. Cl.$^6$ .................................................... F03B 7/00
[52] U.S. Cl. ................ 416/17; 416/32; 416/44; 416/169 R; 416/235; 415/3.001; 415/4.002; 415/4.004; 415/906; 415/907
[58] Field of Search ............... 415/3.1, 4.2, 4.4, 415/123, 124.1, 906, 907; 416/169 R, 228, 17, 32, 44, 49, 235, 236 R, 237

[56] References Cited

U.S. PATENT DOCUMENTS

| 4,186,313 | 1/1980 | Wurtz | 290/44 |
| 5,195,871 | 3/1993 | Hsech-Pen | 416/12 |
| 5,312,228 | 5/1994 | De Jong et al. | 416/191 |

*Primary Examiner*—Edward K. Look
*Assistant Examiner*—Ninh Nguyen
*Attorney, Agent, or Firm*—Swabey Ogilvy Renault; Guy J. Houle

[57] ABSTRACT

A fluid-activatable vane is defined by a thin vane body having opposed narrow leading and trailing side edges and opposed substantially smooth large top and bottom surfaces. The body has a central longitudinal axis and is substantially symmetrical on opposed sides of the axis. An attachment shaft is aligned with the central axis at a near end edge of the vane to secure two diametrically opposed vanes through a coupling wherein the vane will tilt along a 90° arc from a horizontal plane to a vertical plane when exposed to a fluid flow. The two vanes form a propeller and are fixed to a respective end of the attachment shaft in a respective plane and offset 90° from one another. A fluid actuatable torquing curved outer end edge portion is formed integral with the vane body in an outer end edge portion thereof and on a respective side of a central longitudinal axis. The curved outer end edge portions also project from a respective one of the top and bottom surf aces with the curved outer end edge portion adjacent the leading edge projecting upwardly from the vane when the vane is disposed horizontally when secured to a drivable vertical shaft of a turbine.

10 Claims, 2 Drawing Sheets

FLUID-ACTIVATABLE VANE FOR A FLUID TURBINE

BACKGROUND OF INVENTION

1. Technical Field

The present invention relates to a fluid-activatable vane for constructing propellers secured to a vertical drivable shaft of a turbine and particularly wherein each of the vanes is provided with a fluid actuatable torquing means formed integral at an outer end edge portion of the vane and projecting on a respective side of the opposed surfaces of the said vane.

2. Background Art

Various types of vanes have been designed for connection to turbine apparatuses such as wind turbines and wherein the vane has a specific shape and in most cases is rolled by a mechanical coupling whereby to orient the vane at a specific position when entering into the wind flow direction. Such vane structures and turbine apparatuses are for example described in French Patent 2704908 published on Nov. 10, 1994 and French Patent 2668205 published on Apr. 21, 1992. Also, wind turbine apparatuses are described in U.S. Pat. Nos. 5,472,311; 5,553,996; 4,970,404 and many others. However, as previously described, these structures require complex mechanical couplings to control the orientation of the vanes which form the driving propellers. Because most of the structures utilize many propellers in a plurality of stacks of propellers, these structures become complex and costly and often require maintenance thereby causing a shutdown of the turbine. There is therefore a need to provide a vane structure and coupling which substantially overcomes the above disadvantages.

SUMMARY OF INVENTION

It is a feature of the present invention to provide a fluid-activatable vane for use in a turbine and which substantially overcomes the above-mentioned disadvantages of the prior art.

Another feature of the present is to provide a fluid-activatable vane which is provided with integral fluid actuatable torquing means formed in an outer end edge of the vanes to automatically cause the vane to position itself from a passive position to an active position whereby to capture the energy of the fluid flow.

Another feature of the present invention is to provide fluid-activatable vanes connected in diametrically opposed connected pairs to a vertical drivable shaft of a turbine to form propellers and wherein their couplings permit the vane to rotate along a 90° arc from a passive position to an active position and then back to a passive position whereby to capture the energy of a fluid flow.

According to the above features, from a broad aspect the present invention provides a fluid-activatable vane which is defined by a thin vane body having opposed narrow leading and trailing side edges and opposed substantially smooth top and bottom surfaces. The body has central longitudinal axis and is substantially symmetrical on opposed sides of the said axis. Attachment means are provided at a near end edge of the vane and aligned with the central longitudinal axis for securing the vane to a coupling to permit the vane to tilt along a 90° arc from a horizontal plane to a vertical plane. Fluid actuatable torquing means are formed integral with the vane body in an outer end edge portion thereof on a respective side of the central longitudinal axis. The fluid actuatable torquing means projects from a respective one of the top and bottom surfaces with the torquing means adjacent the leading edge projecting upwardly when the vane is disposed horizontally. The vane, when secured to a coupling which is secured to a drivable vertical shaft and exposed to a fluid flow, being displaceable by the fluid flow from a first passive position where the leading edge faces into the fluid flow to a second active position where the bottom surface obstructs the fluid flow to impart a rotational force to the said drivable vertical shaft.

BRIEF DESCRIPTION OF DRAWINGS

The preferred embodiments of the present invention will now be described with reference to the accompanying drawings in which.

DESCRIPTION OF PREFERRED EMBODIMENTS

Figure 1:
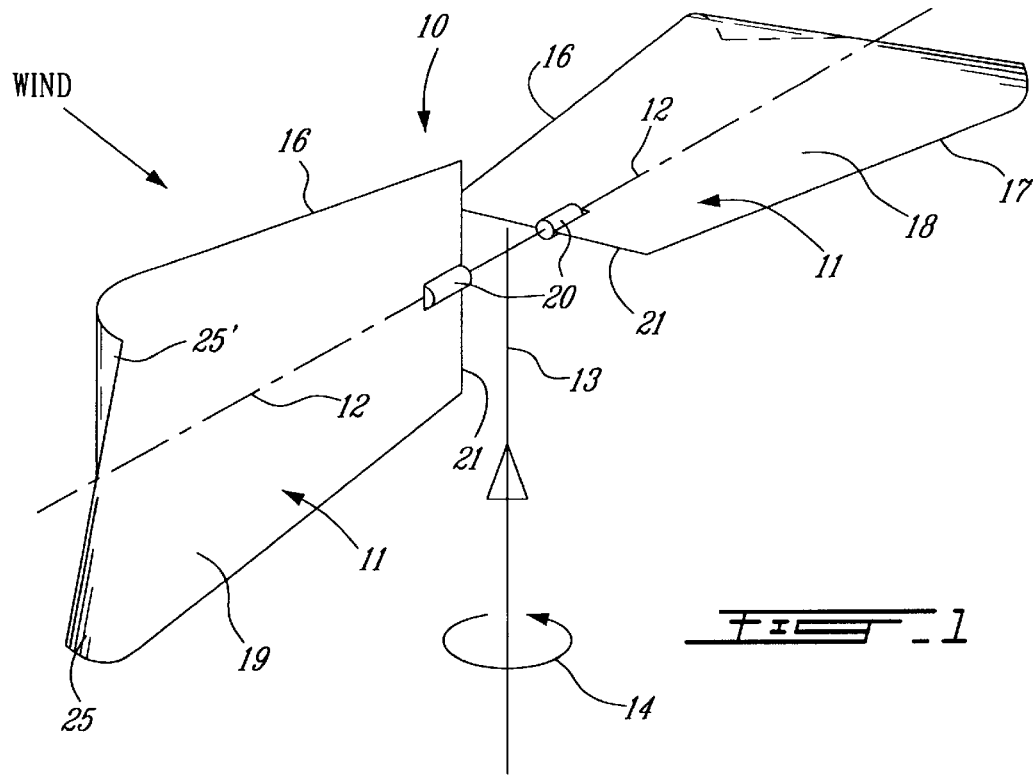
FIG. 1 is a simplified perspective view showing a propeller formed with two fluid-activatable vanes of the present invention.

Referring to FIG. 1, there is shown two fluid-activatable vanes 11 of the present invention and interconnected together through a coupling 30 (see FIG. 4) along their longitudinal axis 12 and in diametrical opposition whereby to form a propeller 10. The propeller 10 is connected, as will be described later, by couplings, to a drivable vertical shaft, schematically illustrated at 13 in FIG. 1, whereby to impart a predetermined axial rotation as depicted by arrow 14 to the drivable vertical shaft 13.

Figure 2:
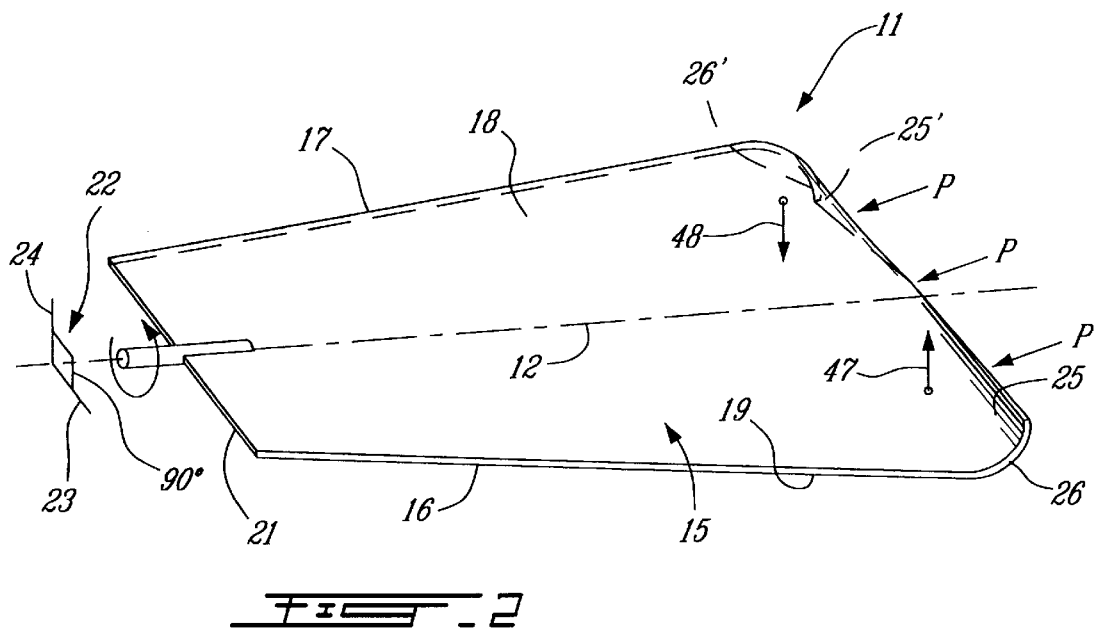
FIG. 2 is a perspective view illustrating the shape and construction of the fluid-activatable vane of the present invention.

Referring additionally to FIG. 2, there will now be described the construction of the fluid-activatable vane 11 of the present invention. As herein shown, the vane is defined by a thin vane body 15 having opposed narrow leading and trailing side edges, 16 and 17 respectively, and opposed substantially smooth large top and bottom surfaces, 18 and 19 respectively. The body has a central longitudinal axis 12 as illustrated in FIG. 1 and the vane is substantially symmetrical on opposed sides of the axis 12.

Figure 4:
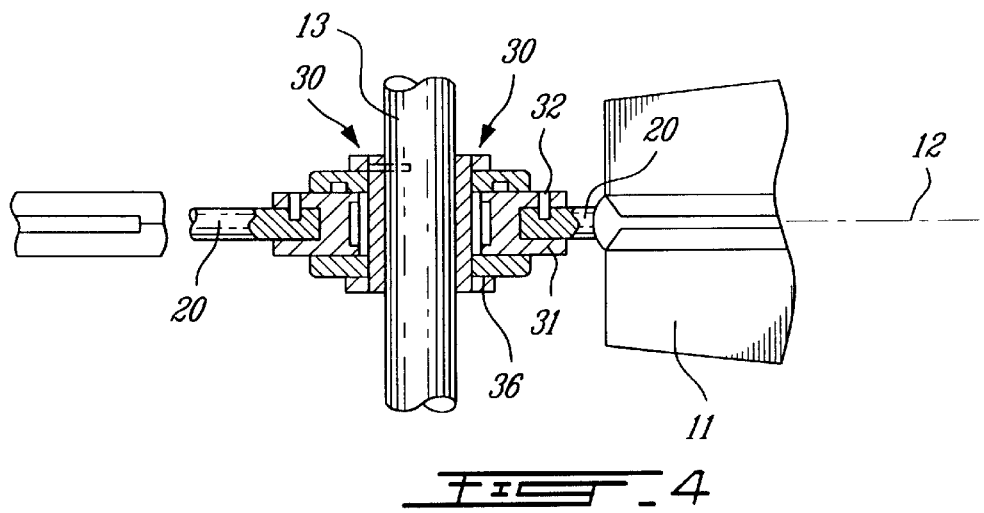
FIG. 4 is a fragmented section view showing the coupling which secures the vane to a vertical drivable shaft.

Attachment means in the form of an attachment shaft 20 is connected to a near end edge 21 of the vanes and is aligned with the central longitudinal axis 12 of both opposed vanes. The shaft 20 secures the vane to the shaft 13 through a coupling 30 as shown in FIG. 4 and which coupling permits the vane to tilt along an arc of 90° as illustrated at 22 from the horizontal plane 23 of the vane to a vertical plane 24 thereof. The purpose thereof will be described later.

An important feature of the vane 11 of the present invention is the fluid actuatable torquing means which is formed integral with the vane body 15 in an outer edge portion thereof. The fluid actuatable torquing means as herein shown is formed by a curved outer end edge portion 25 and 25' formed on opposed sides of the longitudinal axis 12 of the vane. As herein shown, the curved outer end edge portion 25 adjacent the leading edge 16 projects upwardly when the vane is disposed horizontally, as shown in FIG. 2, with the other curved outer end edge portion 25' projecting downwardly above the opposed surface 19 of the vane body.

As shown more clearly in FIG. 2, each of the curved outer end edge portions 25 and 25' are tapered edge portions tapering outwardly from the central longitudinal axis 12 towards a respective one of the leading and trailing side edges, 16 and 17. Each of these curved outer end edge portions are prescribed along an arc which lies between 30° and 50° and merge with the respective one of the leading and trailing side edges 16 and 17 in a smoothly curved rounded edge 26 and 26' respectively.

Figure 3:
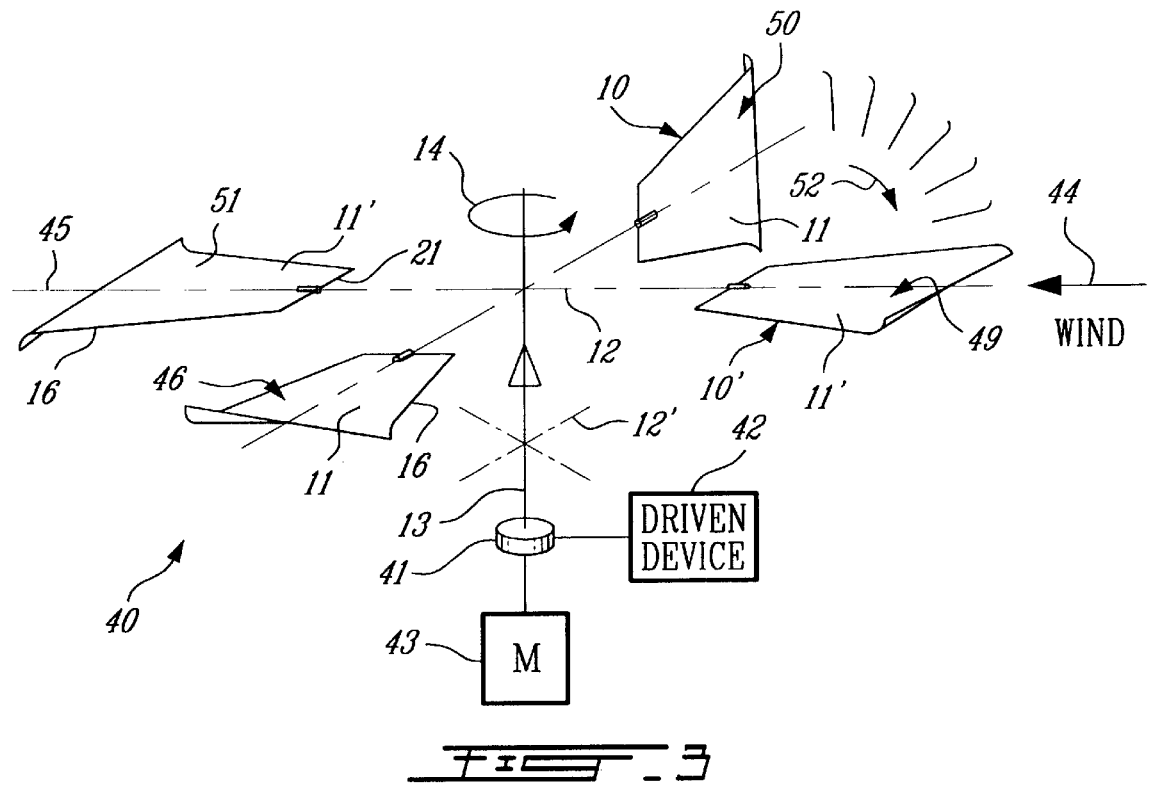
FIG. 3 is a schematic view showing the action of the vane when a pair of propellers are formed thereby and secured to a vertical drivable shaft of a turbine.
Figure 5:
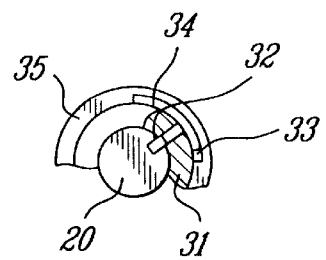
FIG. 5 is a fragmented section view showing a feature of the coupling which permits the vane to rotate along its longitudinal axis within an arc of 90°.

Referring additionally to FIG. 3, there is shown two propellers 10 and 10' formed by diametrically connected pairs of vanes 11 and 11' respectively. These vanes are secured to the vertical drivable shaft 13 through the coupling 30 as shown in FIG. 4. As shown in FIG. 4, the coupling 30 has a connector 31 to which the shaft 20 is secured by a tapping screw 32 or other securing means such as a lock washer, etc. The connector 31 is provided with a projecting pin 33, as shown in FIG. 5, which is located in a channel 34 formed in the cylinder 35 of the coupling 30. The connector 31 is also connected to a torque release bearing assembly 36 to cause the through shaft 20 to freely axially rotate about its longitudinal axis 12 when the drivable shaft 13 exceeds a predetermined r.p.m. Thus, the energy transmitted to the drive shaft 13 can be controlled when the r.p.m. reaches a predetermined rotational speed.

Referring back to FIG. 3, there is shown at 40 a schematic illustration of a wind powered turbine provided with the drivable shaft 13. The drivable shaft is imparted axial rotation as depicted by arrow 14 to cause the shaft to rotate. A uni-directional coupling 55 ensures that the shaft rotates in a single axial direction as shown by arrow 14 in FIG. 1. The shaft 13 may be connected to a gearing assembly 41 to impart a drive to a plurality of devices 42. The drivable shaft 13 may also be connected to an electric motor 43 to produce electrical energy. As previously described, there are at least two propellers 10 and 10' secured to the drivable shaft 13 and connected in stack form. A plurality of stacks, herein schematically illustrated by the axes 12 and 12', and 9 and 9' may be secured to the drivable shaft, as required, to impart axial rotation thereof. The two opposed vanes in each of the stacks 12 and 12' are disposed in a common horizontal plane.

As shown in FIG. 3, the wind direction is depicted by arrow 44 and the fluid flow is along the axis 45. As the vane of propeller 10 approaches position 46 the vane is passive and the leading edge 16 thereof faces into the direction of the wind and as it approaches the wind the force or pressure of the wind, as illustrated by the letter P in FIG. 2, acts on the curved outer end edge portions 25 and 25' of the vane. The pressure acting on the curved outer end edge portion 25 causes an upward force to be generated in the direction of arrow 47 and the pressure acting on the downwardly curved outer end edge portion 25' causes a force to be exerted in an opposed direction as illustrated by arrow 48. Accordingly, this will create a rotational torque about the longitudinal axis 12 of the coupling rod 20 of the vane 1 1 as it faces the direction of the wind as illustrated at position 49 in FIG. 3. This torquing action causes the vane to actually rotate, as aforesaid, causing the vane to move up to its 90° position as it enters its position as illustrated at location 50. Because the opposed vane 11' is connected to the vane 11 through the shaft 20 it will also be displaced by 90° but in a reverse direction of less resistance. In the transverse active position it is noted that the opposed vane 11' of the propeller 10 is in its horizontal transverse passive position cutting into the wind, this being the position of least resistance. On the other hand, the vane at position 50 in FIG. 1 is at its active position of most resistance capturing the energy of the fluid flow, herein the wind energy and transmitting it to the rotatable shaft 13 through the coupling 30. The vane is maintained at its maximum upright 90° position by the restricted movement of the connector 31 of the coupling, as previously described.

As the vane at position 50 continues to be displaced as it rotates about the drivable shaft 13 it gradually pivots and is still at an angle at 51, until the vane returns to its horizontal passive position at 46 presenting its leading edge to the direction of the wind 44. Accordingly, the vane pivots 90° during its 180° travel about the shaft 23 from position 46 to its position 50. By providing a plurality of stacks of these propellers with the propellers of each stack being spaced and offset from the other stacks it can be appreciated that a continuous force can be transferred from the fluid flow to the drivable shaft 13 by the vanes rotating to their active position.

As previously described with the coupling design 30 whenever the drive shaft 13 reaches a predetermined r.p.m. the coupling will automatically release thus insuring that the wind force acting on the drivable shaft 13 is released not to overly rotatably drive the shaft during wind storms or high fluid flow conditions. It can also be appreciated from the above description with reference to the drawings, that the vanes are automatically oriented with respect to a fluid flow and do not require a control mechanism to achieve their orientation. This automatic control is provided by the integrally formed fluid actuatable curved outer end edge portions of the vane. With a plurality of stacks of propellers formed with these vanes it can also be appreciated that a drivable shaft can be placed in movement in a very short period of time when disposed to rotate in a fluid flow. It has been found that maximum energy can be captured from a fluid flow by positioning three propellers with their shafts 20 at angles of 60° between the vanes.

It is within the ambit of the present invention to cover any obvious modifications of the preferred example as described herein, provided such modifications fall within the scope of the appended claims. Although the invention herein described refers particularly to a wind turbine, it is to be understood that it should not be limited thereto and that it could also work effectively as a turbine with the propellers immersed in a water flow.

I claim:

1. A fluid-activatable vane, said vane being defined by a thin vane body having opposed narrow leading and trailing side edges and opposed substantially smooth large top and bottom surfaces, said body having a central longitudinal axis and being substantially symmetrical on opposed sides of said axis, attachment means at a near end edge of said vane and aligned with said central longitudinal axis for securing said vane to a coupling to permit said vane to tilt along a 90° arc from a horizontal plane to a vertical plane, fluid actuatable torquing means formed integral with said vane body in an outer end edge portion thereof on a respective side of said central longitudinal axis, said fluid actuatable torquing means projecting from a respective one of said top and bottom surf aces with said torquing means adjacent said leading edge projecting upwardly when said vane is disposed horizontally, said vane when secured to a drivable vertical shaft by said attachment means through said coupling and exposed to a fluid flow being displaceable by said fluid flow from a first passive position where said leading edge faces into said fluid flow to a second active position where said bottom surface obstructs said fluid flow to impart a rotational force to said drivable vertical shaft.

2. A fluid-activatable vane as claimed in claim 1 wherein said fluid actuatable torquing means is formed by curved outer end edge portions of said vane.

3. A fluid-activatable vane as claimed in claim 2 wherein each said curved outer end edge portions are tapered edge portions tapering outwardly from said central longitudinal axis towards a respective one of said leading and trailing side edges.

4. A fluid-activatable vane as claimed in claim 3 wherein each said curved outer end edge portions merge with said respective one of said leading and trailing side edges in a smoothly curved rounded edge.

5. A fluid-activatable vane as claimed in claim 1 wherein said attachment means is an attachment shaft securable to said coupling, said coupling having a connector permitting said shaft to be rotated axially through a quarter turn to permit said tilting of said vane.

6. A fluid-activatable vane as claimed in claim 1 wherein said fluid flow is an air flow.

7. A fluid-activatable vane as claimed in claim 1 wherein said fluid flow is a liquid flow.

8. A fluid-activatable vane as claimed in claim 2 in combination with a wind powered turbine having a longitudinal drivable vertical shaft, a plurality of said vanes secured to said drivable vertical shaft by respective couplings, said vanes being secured to said drivable vertical shaft in diametrically opposed pairs by said attachment shaft to form propellers, there being at least two propellers secured to said drivable vertical shaft to impart axial rotation to said drivable vertical shaft when said vanes are exposed to wind.

9. A fluid-activatable vane as claimed in claim 8 wherein said at least two propellers are disposed in spaced-apart horizontal planes disposed parallel to one another.

10. A fluid-activatable vane as claimed in claim 8 wherein said coupling is provided with a torque release bearing assembly to cause said attachment shaft to freely axially rotate about said central longitudinal axis when said drivable shaft exceeds a predetermined r.p.m.

* * * * *